(12) United States Patent
Bartling

(10) Patent No.: US 8,517,432 B2
(45) Date of Patent: Aug. 27, 2013

(54) SAND DOSING AND BLOCKING DEVICE

(75) Inventor: Werner Bartling, Elze (DE)

(73) Assignee: Nowe GmbH, Elze (DE)

( * ) Notice: Subject to any disclaimer, the term of this patent is extended or adjusted under 35 U.S.C. 154(b) by 219 days.

(21) Appl. No.: 13/063,785

(22) PCT Filed: Sep. 18, 2009

(86) PCT No.: PCT/EP2009/062100
§ 371 (c)(1),
(2), (4) Date: Apr. 5, 2011

(87) PCT Pub. No.: WO2010/031831
PCT Pub. Date: Mar. 25, 2010

(65) Prior Publication Data
US 2011/0187128 A1  Aug. 4, 2011

(30) Foreign Application Priority Data

Sep. 22, 2008  (AT) ................. A 1473/2008

(51) Int. Cl.
*B61C 15/10* (2006.01)
(52) U.S. Cl.
USPC .............. 291/23; 291/25; 291/35; 291/15
(58) Field of Classification Search
USPC .............. 291/36, 41, 2, 15, 22, 23, 38, 25
See application file for complete search history.

(56) References Cited

U.S. PATENT DOCUMENTS

| | | | |
|---|---|---|---|
| 1,352,205 A | 9/1920 | Lintern | |
| 1,387,620 A * | 8/1921 | Shailer | 291/36 |
| 1,425,575 A | 8/1922 | Burton | |
| 1,812,521 A | 6/1931 | Elston | |
| 1,990,253 A | 2/1935 | Schonig | |
| 2,325,441 A | 7/1943 | Tucker et al. | |
| 2,435,758 A | 2/1948 | Snyder | |
| 2,522,677 A * | 9/1950 | Kelly | 291/36 |
| 2,768,013 A | 10/1956 | Hunt | |

(Continued)

FOREIGN PATENT DOCUMENTS

| CH | 423860 A | 11/1966 |
|---|---|---|
| DE | 418221 C | 8/1925 |
| EP | 1312488 A2 | 5/2003 |
| JP | 2000071979 A | 3/2000 |

OTHER PUBLICATIONS

International Search Report published Mar. 25, 2010 for PCT/EP2009/062100 filed Sep. 18, 2009.
Written Opinion for PCT/EP2009/062100 filed Sep. 18, 2009.
Office Action from Austrian Patent Office dated Aug. 18, 2009 for AT A 1473/2008 (priority document for this application).

(Continued)

*Primary Examiner* — Mark Le
(74) *Attorney, Agent, or Firm* — Fleit Gibbons Gutman Bongini & Bianco PL; Martin Fleit; Paul D. Bianco

(57) ABSTRACT

A sand dosing and blocking device for sand spreading systems for vehicles, particularly rail vehicles with drive, has a sand supply container with an outlet opening which can be closed by a closing element for the dosed release of sand to a conveyor unit which is preferably pneumatically activated. The closing element is formed by a lifting rod of an electrically activated lifting magnet. The lifting magnet is arranged inside the sand supply container in the area of the outlet opening. Frequency control of the lifting magnet varies the dosed flow of sand, which may be varied in response to vehicle wheel speed.

14 Claims, 2 Drawing Sheets

(56) References Cited

U.S. PATENT DOCUMENTS

| | | | | |
|---|---|---|---|---|
| 2,909,383 | A | * | 10/1959 | Nanfeldt ........................ 291/23 |
| 2,984,508 | A | * | 5/1961 | Faue .............................. 291/41 |
| 3,774,945 | A | | 11/1973 | Lee et al. |
| 2004/0160064 | A1 | * | 8/2004 | Kish et al. ........................ 291/3 |

OTHER PUBLICATIONS

Office Action from Austrian Patent Office dated Sep. 28, 2009 for AT A 1473/2008 (priority document for this application).

Chinese Office Action dated Dec. 5, 2012 for parallel application in China and English translation.

\* cited by examiner

SAND DOSING AND BLOCKING DEVICE

FIELD OF THE INVENTION

The invention relates to a sand dosing and blocking device for sand spreading systems for vehicles, particularly rail vehicles with drive, comprising a sand reservoir with an outlet opening adapted to be closed by a closing element, for the dosed discharge of the sand to a conveyor unit that is preferably operated pneumatically.

BACKGROUND OF THE INVENTION

EP 1 312 488 A2 discloses a blocking device for a sand dosing device having a dosing piston connected to a lifting magnet. In a closed position of an inlet channel of the dosing device, an annular bulge of a seal that is connected with the dosing piston rests on a projection of a housing wall. For releasing the inlet channel, the bulge is lifted off the projection by means of the dosing piston.

U.S. Pat. No. 2,325,441 A describes a sand spreader with a reservoir for sand, the bottom end of which is provided with an opening that is adapted to be closed by means of a cup-shaped valve cap. To this end, the valve cap is connected with a piston of a lifting magnet.

JP 2000-071979 A discloses a spreader with a reservoir and an inlet channel. In the closed position, the inlet channel is closed by a closing piston that is fastened to a piston of an electrically operable lifting magnet.

CH 423860 A describes another sand spreading device for vehicles in which a spreading channel is adapted to be closed by means of an elastically deformable tube. For the spreading of sand, coils are excited, so that a slider or plunger-type armature, respectively, that is fastened to the tube is pulled outwardly contrary to the effect of pressure springs, so that the channel is released.

U.S. Pat. No. 1,990,253 A and DE 418 221 C disclose sand spreading devices with mechanical swinging devices.

Sand spreading systems are particularly used in the case of rail vehicles with drive. In so doing, the sand available in the sand reservoir is fed, via the sand dosing and blocking device, to a conveyor device that is usually actuated pneumatically, and subsequently the sand is conducted via appropriate lines to the gap between the vehicle wheel and the rail or the ground, respectively, so that a slip and slide protection is formed.

The sand dosing devices, in particular the piston-controlled sand dosing and blocking devices known from prior art feature a number of disadvantages that will be listed in the following.

The installation of the known, in particular piston controlled sand dosing and blocking devices is basically only possible externally of the sand reservoir, which increases the space requirement of the sand dosing device substantially. Due to the installation height required, only a comparatively small filling volume of the sand reservoir can be provided in the case of a limited installation space. This results in shorter or more sand re-filling intervals.

It is a disadvantage that, with the known sand dosing and blocking devices, the amount of sand to be discharged can moreover be dosed with comparatively little accuracy only, since the amount of sand transmitted to the conveying device is strongly influenced by the sand quality, i.e. in particular the size of the grains of sand. It is especially the setting of small amounts of sand that is possible in a limited manner only with the known piston-controlled sand dosing and blocking devices. The smallest dosing piston opening gap and hence also the smallest setting of the amount of sand depends on the grain size of the sand used, so that the largest grain of sand determines the smallest dosing piston opening gap or the smallest amount of sand, respectively.

During operation of the sand spreading system, in the case of pneumatic sand conveyance, a negative pressure is produced by the injector function by the suction effect, said negative pressure having a negative effect in particular in the case of small settings of the amount of sand or a small dosing piston opening gap, respectively, since the sand is compacted in the outlet cross-section and functional disorders, e.g. congestions, may be caused. Even by particular additional measures (e.g. the controlled supply of an air flow into the injector chamber for reducing the negative pressure via a bypass) can this effect be compensated for partially only.

The setting of the amount of sand can only be performed individually for every single sand dosing device, for instance, by a setting screw at the actuator which is positioned externally. This means that every single sand dosing device has to be adjusted to the amount of sand required with a correspondingly high effort of time and personnel.

Furthermore, the sand dosing devices known have no useful possibility of continuously regulating the amount of sand conveyed as a function of the velocity of the vehicle.

SUMMARY OF THE INVENTION

The object of the present invention is to provide a sand dosing and blocking device as mentioned above, by means of which the disadvantages of known piston-controlled sand dosing and blocking devices may be avoided or reduced with sufficient certainty. The sand dosing and blocking device according to the invention is intended to be constructed in a preferably space and weight-saving, maintenance-free, low-wear, and cost-optimized manner. Furthermore, it is intended that all the other known constructions of sand spreading systems may be replaced without major effort by the sand dosing and blocking device according to the invention.

The object according to the invention is solved by the above-mentioned sand dosing and blocking device in which the lifting magnet is positioned inside the sand reservoir in the region of the outlet opening. From the use of such a magnet-operated sand dosing and blocking device in which the lifting magnet is provided inside of the sand reservoir in the region of the outlet opening there result new constructional and functional possibilities. The outlet opening of the sand reservoir is opened and closed by the movement of the lifting rod constituting the armature of the lifting magnet. The amount of sand discharged to the conveying device is independent of the size of the grain of sand and of the quality of the sand, respectively, since the lifting piston, with every lift, presses or discharges a uniform amount of sand out of the sand reservoir into the conveyor device. This is contrary to the known sand dosing and/or blocking devices in which the sand flows, due to the own weight thereof, through a released outlet opening. Since the lifting magnet is positioned inside the sand reservoir in the region of the outlet opening, it is possible to implement an extremely small architecture by which only an unsubstantial sand filling volume is lost in the sand reservoir. Furthermore, it is possible to use higher structural shapes for the sand reservoirs due to this installation concept. In addition, the conveyance of the sand is promoted by the vibrations of the lifting magnet.

In order to protect the lifting magnet from damage by dust in the region of the sand reservoir through which the sand passes, the lifting magnet may at least partially be enclosed by a dust protection of a suitable material and of a suitable shape.

For the safe closing of the outlet opening of the sand reservoir, a sealing element, preferably of an elastically deformable plastic material, may be arranged at the lifting rod. This sealing element is pressed against the outlet opening in the sand reservoir so as to interrupt the sand flow. In order to release a defined amount of sand via the outlet opening, the sealing element is displaced appropriately by the lifting rod of the lifting magnet.

Preferably, the lifting rod is connected with a return spring. This return spring ensures that the outlet opening is closed in the current-free state of the lifting magnet. The return spring is preferably positioned in the housing of the lifting magnet and is designed as a compression spring. The lifting magnet preferably operates "in a pressing manner" in that the lifting rod is moved in the case of current flow and the lifting rod is positioned via the return spring to the closed end position of the closure element in the current-free state.

In accordance with a further feature of the invention, pins or the like for loosening the sand are provided at the lifting rod. By means of such pins or the like tit is possible to loosen the sand in the sand reservoir in the region of the outlet opening, so that it is possible to safely prevent negative influences. For instance, it is possible to position two pins staggered by 90° on top of each other at the lifting rod below the dust protection, said pins supporting the sand flow in the sand-passing region that is particularly critical.

Preferably, a dosing housing is integrated in the outlet opening of the sand reservoir and is appropriately connected with the sand reservoir.

The dosing housing comprises a plurality of, preferably four, sand inlet openings staggered by 90°, via which the sand is transported from the sand reservoir to the conveying device positioned therebelow. The sand inlet openings in the dosing housing are positioned such that a complete emptying of the sand reservoir can be achieved. The sand-passing openings preferably have a constant cross-section and are designed for a maximum sand mass flow rate.

A sealing is preferably positioned between the sand reservoir and the dosing housing. This sealing, too, is preferably made of an elastically deformable plastic material.

The dosing housing is adjoined in the direction of the conveyed sand by a sand feeding injector of the conveying device. The injector effect causes a negative pressure in this injector which causes the conveyance of the sand. This sand feeding injector of the preferably pneumatic conveying device which is positioned below the dosing housing is followed by a line or a tube, respectively, that conveys the sand to the gap between the vehicle wheel and the rail or ground, respectively.

The lifting magnet is preferably connected with a control device. By means of this control device it is possible to adjust the time and the duration of the actuation of the lifting magnet.

The control device is preferably designed to control the frequency of the lifting magnet. The control device thus determines the frequency at which the lifting magnet is activated and the lifting rod of the lifting magnet is subsequently moved. The frequency thus defines the number of lifts, i.e. the reciprocating movements of the lifting rod per time unit. The duration of the activation of the lifting magnet and the duration of the deactivation of the lifting magnet during a lift may be selected to be equal or else different. Such a frequency-controlled sand dosing and blocking device may improve the functional and qualitative properties of the sand spreading system. By means of the defined controlled lifting frequency of the lifting magnet it is possible to transmit a defined amount of sand via the outlet opening of the sand reservoir to the conveying device. It is accordingly possible to control the amount of sand in an uncomplicated and exact manner by means of the lifting frequency of the lifting magnet, which constitutes a substantial improvement vis-à-vis known sand dosing and/or blocking devices in which the amount of sand discharged is set predominantly by means of the opening cross-section of the outlet opening. The lifting frequency is inversely proportional to the discharge of the amount of sand, i.e. a low lifting frequency results in a large amount of sand, and a high lifting frequency results in a small amount of sand. By the above-mentioned positioning of the lifting magnet in the interior of the sand reservoir and the mode of operation with a particular lifting frequency it is possible to achieve improvements during the conveyance of the sand vis-à-vis conventional devices. This is because the driving dynamics of the vehicles, in particular rail vehicles, frequently lead to high-frequency vibrations and/or shocks that may cause substantial sand compaction in the sand reservoir and result, as a function of typically relatively small sand outlet cross-sections in the sand dosing device, in undefined sand discharges especially in the case of small settings of the amount of sand. Similar sand discharge problems may also be caused by the compressed air of the conveying device by the fact that undefined sand discharges result both in the case of sand spreading systems operated with excess pressure and with negative pressure, also as a function of relatively typically small sand outlet cross-sections in the sand dosing device due to sand compaction. Such negative manifestations may be solved in a simple manner by the special effect resulting from the positioning of the lifting magnet in the interior of the sand reservoir, i.e. in the sand itself, and/or from the vibration energy caused by the lifting magnet by the frequenting mode of operation, since the sand surrounding the magnet is loosened and hence the sand flow is promoted.

Preferably, the control device is connected with a device for detecting the velocity of the vehicle, so that a velocity-dependent lifting frequency regulation is possible. Thus, a continuous regulation of the amount of discharged sand as a function of the velocity of the vehicle is enabled.

The control device is preferably also connected with the conveying device, so that the transport of the sand after the sand dosing device may be regulated as a function of the amount of dosed sand. The control device may, for instance, be connected with a magnetic valve in the compressed air line of a pneumatically actuated conveying device.

BRIEF DESCRIPTION OF THE DRAWINGS

The present invention will be explained in more detail by means of the enclosed drawings. There show.

DETAILED DESCRIPTION OF THE INVENTION

Figure 1:
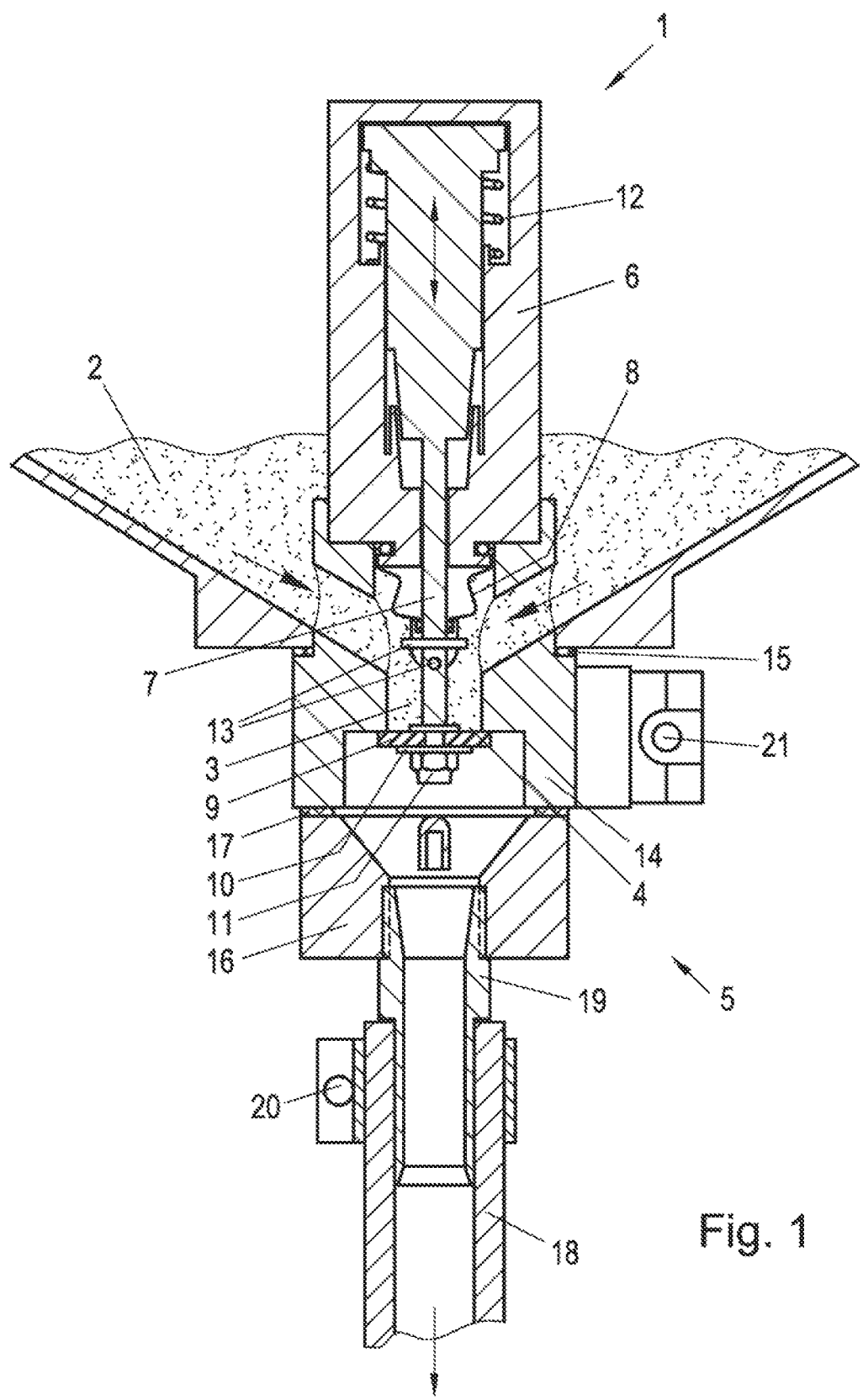
FIG. 1 an embodiment of the sand dosing and blocking device according to the invention in cross-section.

The sand dosing and blocking device 1 illustrated in FIG. 1 consists of a lifting magnet 6, the lifting rod 7 of which closes as a closing element 3 the outlet opening 4 of the sand reservoir 2. A sealing element 9, preferably of an elastomer, is arranged at the lifting rod 7. This sealing element 9 may be fastened to the rod 7 via an appropriate supporting disk 10 and a fastening nut 11. In the bottom region of the sand reservoir 2, a dosing housing 14 is positioned which comprises a plurality of sand inlet openings, preferably four sand inlet openings that are each staggered by 90° around the circumference, through which the sand of the sand reservoir 2 is transported to the outlet opening 4 along the arrows shown. These sand outlet openings enable a uniform, safe, and complete sand outlet from the sand reservoir 2 and prevent sand depositions. The dosing housing 14 is, with the exception of the installation flange, positioned inside the sand reservoir 2. This constructional concept offers substantial constructional advantages with respect to the spatial vehicle-side installation design.

For protection of the lifting magnet 6 from dust, a suitable dust protection 8 may be arranged. Furthermore, a sealing 15 may be provided between the dosing housing 14 and the sand reservoir 2.

The lifting rod 7 of the lifting magnet 6 is provided with a return spring 12, so that the lifting rod 7, in the current-free state of the lifting magnet 6, is taken automatically to the closing position in which the outlet opening 4 of the sand reservoir 2 is closed. Thus, an unintended sand outlet in the current-free state of the lifting magnet 6 is prevented by the return spring 12.

The dosing housing 14 is followed in a downward direction, i.e. in the direction of the conveyed sand, by an injector housing 16 of the preferably pneumatic conveying device 5. A sealing 17 may be provided between the dosing housing 14 and the injector housing 16. At the injector housing 16 a sand transporting tube 18 is mounted via an appropriate tube connection 19 and a fastening clamp 20. The sand is transported via the sand transporting tube 18 from the injector housing 16 to the gap between the vehicle wheel and the rail or ground, respectively (not illustrated). The conveyance of the sand is preferably performed by means of compressed air that is introduced via an appropriate compressed air connection 25 (see FIG. 2). The connector 21 for supplying the lifting magnet 6 with electrical energy is positioned externally of the dosing housing 14.

Figure 2:
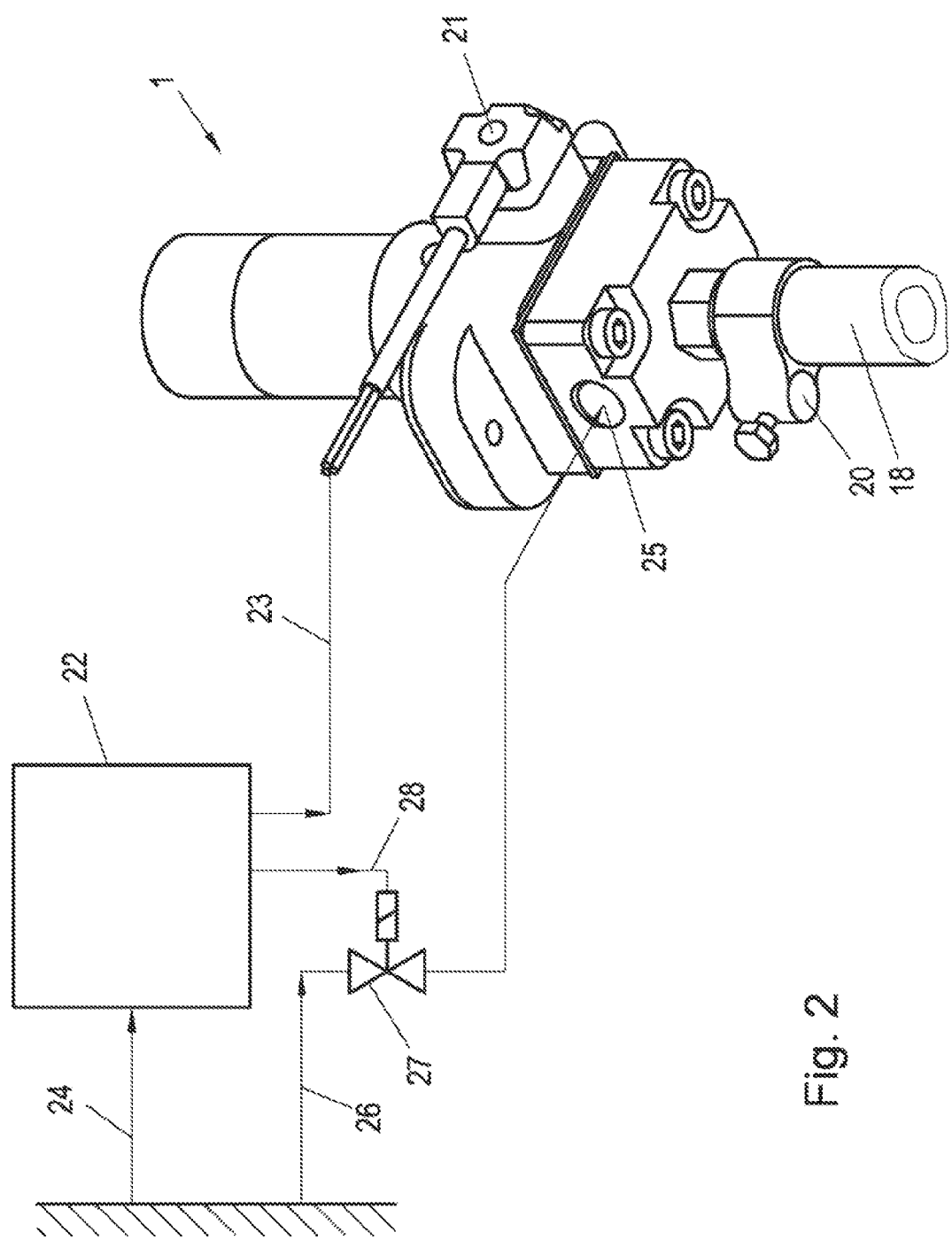
FIG. 2 a schematic diagram for illustrating the control of the sand dosing and blocking device according to the invention.

FIG. 2 shows the control of a sand dosing and blocking device 1 in accordance with the invention in schematic illustration. Accordingly, the sand dosing and blocking device 1 is connected with a control device 22. This is performed via an appropriate electrical line 23 that is connected with the connector 21 of the lifting magnet 6. The control device 22 thus controls the actuation of the lifting magnet 6. The control device 22 receives the control signals from the vehicle via a corresponding control line 24. The control device 22 is designed for the frequency-controlled actuation of the lifting magnet 6. The control device 22 controls the lifting frequency of the lifting magnet 6 and hence the amount of discharged sand of the spreading process. By a reduction of the lifting frequency of the lifting magnet 6 an increase of the amount of sand is achieved. Advantageously, the control device 22 is also connected with the conveying device 5. In the case of the pneumatic conveying device 5 this may be performed in that a magnetic valve 27 arranged in the compressed air line 26 is connected with the control device via a control line 28. Thus, the compressed air for conveying the sand that gets into the compressed air connection 25 after the sand dosing and blocking device 1 may be influenced by the control device 22. By means of this connection of the control device 22 with the pneumatic conveying device 5 a subsequent blowing clean of the sand-conveying lines after the termination of the sand spreading function may also be caused via the control line 28.

Preferably, the control device 22 is connected with a device for detecting the velocity of the vehicle, so that a discharge of an amount of sand which is continuously regulated proportionally to the vehicle velocity is enabled. For instance, a voltage signal of e.g. 0-10 V that is proportional to the vehicle velocity may be transmitted to the control device 22 (not illustrated).

The lifting frequency-controlled magnet-operated sand dosing and blocking device 1 is designed as a basic component of a preferably electro-pneumatically operated sand spreading system and is preferably designed for the use in rail vehicles with drive. The sand dosing and blocking device 1 enables to reliably control the sand spreading function on demand in a simple and safe manner. The sand dosing and blocking device 1 according to the invention is characterized by constructional simplicity and particular functional properties as compared to conventional sand dosing and blocking devices.

The positioning of the sand dosing and blocking device 1 in the sand spreading system which is arranged directly in the region of the outlet opening 4 of the sand reservoir 2 is essential. By means of this installation position of the sand dosing and blocking device 1 and/or of the lifting magnet 6, in connection with the functioning principle and the constructional spatial design of the sand-passing region of the dosing housing 14 in the interior of the sand reservoir 2, and the control device 22 that enables a frequency-controlled mode of operation of the lifting magnet 6, substantial advantages are achieved vis-à-vis known devices. The lifting magnet 6 has a constant non-settable working lift and is, in the current-free state, in a position that closes the outlet opening 4 of the sand reservoir 2 and, in the current-bearing condition in a position in which the outlet opening 4 is released. By means of a frequency control of the lifting magnet 6 it is possible to control the amount of sand exiting through the outlet 4.

A sand spreading process is usually performed by means of manual actuation of the driver of a vehicle or, in the case of modern vehicles, automatically by means of the slip and slide protection of the vehicle. In so doing, the control device 22 is activated by the vehicle-side ON signal, and the lifting magnet 6 and the magnetic valve 27 of the compressed air line 26 are simultaneously activated by two separate control signals. By the alternating actuation of the lifting magnet 6 with the desired lifting frequency, the sand flow is released and, with simultaneous activation of the conveying device, the sand is transported by means of compressed air via the compressed air connection 25 through the sand transporting tube 18 to the gap between the vehicle wheel and the rail.

After the termination of the sand spreading process by switching the lifting magnet current-free, the lifting rod 7 is taken to the closed position by means of the return spring 12, so that the outlet opening 4 of the sand reservoir 2 is closed by the sealing element 9. The magnetic valve 27 in the compressed air line 26 may be readjusted due to delayed release for some seconds, for instance, maximally five seconds, so that the sand-conveying sand transporting tube is blown to be clean of sand and dust. Thus, line congestions due to sand depositions in combination with moisture may be prevented.

There is the possibility of determining, depending on the problem posed by the vehicle concept to be equipped, various modes of operation of the sand spreading system and/or of the sand dosing and blocking device 1 in accordance with the invention.

Variant 1: Only one single-stage sand spreading function with only one fixedly set constant sand discharge amount is defined for the vehicle—the result is only one ON/OFF signal from the vehicle and from the control device 22 only one frequency signal for the lifting magnet 6.

Variant 2: A continuous discharge of the amount of sand which is controlled as a function of velocity is defined for the vehicle—the result is that a control signal assigned to the velocity—e.g. 0-10 V—is transmitted from the vehicle to the control device 22, and the control device 22 transmits the vehicle signal to the lifting magnet 6 as a frequency signal that is proportional to the velocity, and controls the continuous discharge of the amount of sand.

The control may also offer a further system advantage. In rail vehicles, typically two sand spreading systems (per wheel 1 system) are installed per axle, and in very many cases several axles along the length of the vehicle are equipped with sand spreading systems. In this case there is the possibility of controlling all sand spreading systems that are installed in the vehicle via only one single control depending on the direction of driving.

The sand dosing and blocking device 1 according to the invention is the main component of a sand spreading system and is decisive for the system construction, the functionality, and the reliability (susceptibility to failure) of a sand spreading system.

The sand dosing and blocking device 1 described absolutely meets the high demands of a rail-suitable system and stands out by particular novel functional features, by high immunity to failure, and by reliability.

The invention claimed is:

1. A sand dosing and blocking device (1) for sand spreading systems for vehicles comprising a sand reservoir (2) with an outlet opening (4) that is adapted to be closed by means of a closing element (3), for dosed discharge of the sand to a conveyor unit (5) that is activated pneumatically, wherein the closing element (3) is formed by a lifting rod (7) of an electrically operable lifting magnet(6), wherein the lifting magnet (6) is arranged inside the sand reservoir (2) in a region of the outlet opening (4), and the lifting magnet (6) is connected with a control device (22), which control device (22) includes frequency controlling of the lifting magnet (6), wherein the control device (22) is connected with a device for detecting a velocity of the vehicle, and includes a velocity-dependent lifting frequency regulation of the lifting magnet.

2. The sand dosing and blocking device (1) according to claim 1, wherein the lifting magnet (6) is at least partially enclosed by a dust protection (8).

3. The sand dosing and blocking device (1) according to claim 1, wherein a sealing element (9), of an elastically deformable plastic material, is arranged at the lifting rod (7).

4. The sand dosing and blocking device (1) according to claim 1, wherein the lifting rod (7) is connected with a return spring (12).

5. The sand dosing and blocking device (1) according to claim 1, wherein pins (13) or the like for loosening the sand are provided at the lifting rod (7).

6. The sand dosing and blocking device (1) according to claim 1, wherein a dosing housing (14) is integrated in the outlet opening (4).

7. The sand dosing and blocking device (1) according to claim 6, wherein the dosing housing (14) comprises a plurality of, sand inlet openings.

8. The sand dosing and blocking device (1) according to claim 7, wherein a sealing (15) is arranged between the sand reservoir (2) and the dosing housing (14).

9. The sand dosing and blocking device (1) according to claim 6, wherein a sand feeding injector (16) of a conveying device (5) adjoins the dosing housing (14).

10. The sand dosing and blocking device (1) according claim 1, wherein the control device (22) is connected with a pneumatically operated conveying device (5).

11. The sand dosing and blocking device according to claim 7 wherein the dosing housing (14) comprises four sand inlet openings staggered by 90°.

12. A sand dosing and blocking device according to claim 1, wherein the vehicle is a rail vehicle with drive.

13. The sand dosing and blocking device according to claim 1 wherein the frequency controlling of the lifting magnet provides for a variable rate of sand dosing.

14. The sand dosing and blocking device according to claim 13 wherein increasing a frequency of the frequency controlling decreases a dosing of the variable rate of sand dosing.

* * * * *

UNITED STATES PATENT AND TRADEMARK OFFICE
CERTIFICATE OF CORRECTION

PATENT NO. : 8,517,432 B2 Page 1 of 1
APPLICATION NO. : 13/063785
DATED : August 27, 2013
INVENTOR(S) : Werner Bartling It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 233 days.

Signed and Sealed this

Fifteenth Day of September, 2015

Michelle K. Lee
*Director of the United States Patent and Trademark Office*